United States Patent Office 3,443,644
Patented May 13, 1969

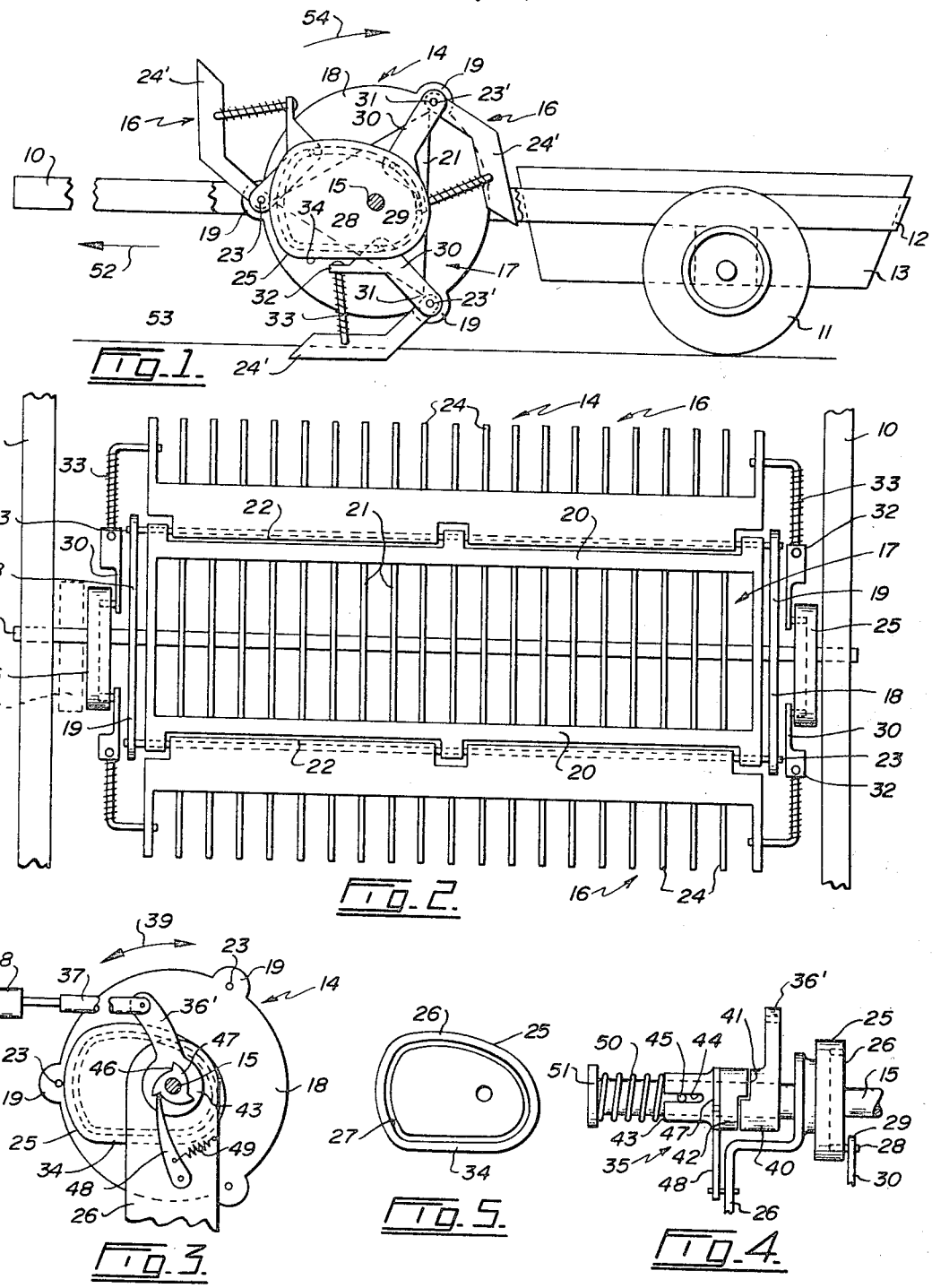

3,443,644
STONE PICKING MACHINES
John C. Schindelka, Box 178, Raymore,
Saskatchewan, Canada
Filed May 23, 1966, Ser. No. 552,311
Int. Cl. A01b 43/00
U.S. Cl. 171—63        2 Claims

ABSTRACT OF THE DISCLOSURE

A wheeled chassis carrying a stone receptacle and an intermittently rotatable stone picker assembly which includes at least three stone picker units arranged so that when one unit occupies a ground engaging position, another unit is in a stone carrying position, and still another unit is in a stone dumping position adjacent the receptacle. A fluid operator intermittently rotates the picker assembly to move each picker unit from one position to the next. The picker units are pivotally mounted on the assembly for projecting and retracting movement and guide means are provided for retracting the units as they pass the stone receptacle.

---

This invention relates to new and useful improvements in stone picking machines, particularly stone picking machines of the type described and claimed in my corresponding U.S. Patent No. 3,082,828.

In the above mentioned patent, I describe a stone picking machine which includes one set of stone picking forks which rake through the surface of the ground and collect stones thereon. When sufficient stones have been collected, a hydraulic piston and cylinder assembly is actuated which rotate the set of stone picking forks through approximately 180° thus permitting the stones to be dumped from the forks into a stone container carried on the chassis of the machine.

While this particular device works well, it suffers from one principal disadvantage, namely, the fact that when the set of forks is being dumped, the machine has to be stopped, otherwise some of the ground is missed.

The present device overcomes this disadvantage by the provision of a central hollow element mounted for rotation transversely of the chassis. A plurality of sets of stone picking forks are pivotally attached to this element and means are provided to rotate the element together with the forks, each time the set of forks engaging the ground requires dumping. In the present embodiment I have provided three sets of forks, but of course any number can be utilized as desired.

When one of the sets of forks is engaging the ground and picking up stones, the set of forks in advance of this particular set is carrying the stones in an elevated position so that the vibration of the machine in use permits the earth and soil to fall through the forks while retaining the stones in the set of forks.

As soon as the main element is rotated one-third of a revolution, the set of forks carrying the stones dump same into the stone bucket carried in the chassis and then is ready to engage the ground the next time the device is actuated.

A further advantage of the present device resides in the fact that I provide means to extend and retract forks in relation to the center element. This is so that the set of forks passing the edge of the bucket is retracted against the center element thus clearing the edge of the bucket. Furthermore, this same means permit the forks to move substantially parallel to the ground during the rotative movement once again assisting in the pick up of stones from the ground.

The principal object and essence of the invention is therefore to provide a stone picking device which is not rotating when raking and picking stones yet which can be rotated when it is desired to dump the stones.

Another advantage of the present device is to bring another set of forks into ground engaging position as the loaded set of forks is moved towards the dumping position, thus eliminating the necessity of stopping the machine to dump the stones from the forks and ensuring that all of the ground is covered.

Yet another object of the invention is to provide a device of the character herewithin described which is simple in construction, economical in manufacture, and otherwise well suited to the purpose for which it is designed.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a side elevation of the device with the rotative mechanism removed for clarity.

FIGURE 2 is a top plan view of the stone picking element.

FIGURE 3 is an end view of the central portion of the element showing the actuating lever and part of the ratchet assembly.

FIGURE 4 is a front elevation of the actuating mechanism enlarged for clarity.

FIGURE 5 is an inner side elevation of one of the cam plates.

In the drawings like characters of reference indicate corresponding parts in the different figures.

Proceeding therefore to describe my invention in detail, reference character 10 illustrates a substantially rectangular chassis mounted upon a pair of ground engaging wheels 11 (one of which only is shown) said wheels being adjacent the rear end 12 of the chassis.

Also mounted on the chassis adjacent the wheels 11 is a stone collector box 13 capable of dumping action. However, as this dumping action is shown in the above mentioned patent and forms no part of the present invention, further details are not believed to be required.

The stone picking element collectively designated 14 is journalled transversely of the framework 10 upon a spindle 15.

In the present embodiment, three sets of stone picking forks collectively designated 16 are provided, but of course it will be appreciated that more may be incorporated if desired.

With the three sets of forks 16, the stone picking element 14 comprises a substantially triangular hollow main member 17, said main member consisting of a pair of end plates 18, having mounting lugs 19 formed on the perimeter thereof at approximately 120° from one another. Transverse members 20 extend between the end plates 18 adjacent the lugs 19 and spaced and parallel bars 21 extend between adjacent transverse members 20 thus giving a substantially triangular cross-sectional configuration to this main member 17.

Each set of stone picking forks 16 comprises a transverse supporting member 22 pivotally secured to hinge point 23 and lugs 19 by means of pivot pins 23'. A plurality of spaced and parallel stone picking fingers 24 extend from the transverse members 22 so that each set of forks extends outwardly from the hollow main member 17 and is pivotally secured adjacent the apices of the triangular formation thereof.

Means are provided to extend and retract the forks 16 with respect to the main member 17 so that depending upon the position of the individual set of forks, with respect to the access of rotation, the set of forks is either in the ground engaging position, the rock transfer position, or the rock dumping position.

In order to accomplish this extension and retraction of the sets of the forks 16, I provide a cam plate 25 adjacent each end plate 18 of the main member 17 and mounted freely upon the spindle 15. However, the cam plate is stationary inasmuch as it is secured to a bracket 26 which in turn is secured to the main framework, the point of attachment not being shown in the accompanying drawings.

Upon the inner face 26 of this cam plate is a cam track 27 shown in FIGURE 5 and a pin 28 engages this track 27 and acts as a cam follow-up. This pin is situated adjacent the apex 29 of a bellcrank 30, there being a bellcrank for each set of forks 16.

One end of one arm 31 of each bellcrank is pivotally connected to the pivot pin 23 of each set of stone picking forks 16 and the end of the other arm 32 of the bell crank is engaged by one end of a rod 33. The upper end of rod 33 is pivotally connected to the end fingers 24' of each set of stone picking forks 16 as clearly shown in FIGURE 1.

As the stone picking element 14 is rotated, the cam follow-up 28 acting within the cam plates 26 extend and retract the sets of forks 16 and of particular interest is the relatively flat base 34 of the cam track which maintains the particular set of forks 16 parallel with the ground during the initial rotation of the element 14.

Also of note is the configuration of the cam whereby the particular set of forks 14, after the stones have been dumped therefrom, are retracted substantially against the main member 17 so that the stone picking fingers clear the forward edge of the stone receptacle 13.

Means are provided to rotate the element 14 incrementally as the ground engaging forks become full of stones. This is shown in detail in FIGURE 4 and is indicated collectively by the reference character 35. In FIGURE 4, the mechanism is shown out of proportion horizontally for clarity, but in effect it is situated within the dotted lines indicated by reference character 36 in FIGURE 2.

An actuating lever 36' is freely mounted upon spindle 15 and is connected via linkage 37 to a hydraulic piston and cylinder assembly 38 shown schematically in FIGURE 3.

The controls for the operation of this hydraulic piston and cylinder assembly are on the towing means (not illustrated) and the lever 36' therefore can reciprocate in the direction of double-headed arrows 39.

The hub 40 mounting the lever 36' upon spindle 15 is provided with a ratchet clutch face 41 upon one face thereof engageable within a corresponding ratchet clutch face 42 situated upon a hub 43 which freely surrounds spindle 15 also. This hub however, is provided with a slot 44 and a pin 45 extends through shaft 15 and through slot 44 so that rotation of the hub 43 rotates the shaft 15 together with the element 14 secured thereto.

In the present embodiment there are three ratchet engagement notches 46 and the stroke of the hydraulic piston and cylinder assembly 38 is such that movement of the operating lever 36' in one direction, rotates the shaft 15 through 120°.

It is necessary to prevent the shaft from moving in the opposite direction due to the pressure of the stone picking fingers with the ground and in this connection I provide a ratchet plate 47 on the hub engageable by a ratchet finger 48 maintained in contact by means of spring 49 and shown in detail in FIGURE 3.

A spring 50 reacts between an end plate 51 on the end of shaft 15 and the end of the hub 43 to permit the ratchet faces 41 and 42 to over-ride one another on the return stroke.

In operation, the device is pulled in the direction of arrow 52 with one set of rock picking forks 16 engaging the ground surface 53 and in this connection it will be appreciated that the fingers 24 are angulated as shown in FIGURE 1.

The fingers sift the soil through and retain stones or rocks above a predetermined size thereon. When sufficient stones are captured by the fingers, the hydraulic piston and cylinder assembly 38 is actuated thus rotating the element 14 through 120° and in the direction of arrow 54.

This brings the next set of fingers into engagement with the ground and the stones and rocks are retained between the fingers of the subsequent set and the bars 21 of the central member, any surplus soil being shaken through the bars to be deposited upon the ground.

The next 120° movement of the element 14 dumps the stones from the set of forks that are elevated and brings the next succeeding set of forks into engagement with the ground. The cam plate and follow-up extends and retracts the sets of forks as necessary and as hereinbefore described.

What I claim as my invention is:

1. In a stone picking machine, the combination of a wheeled chassis having a stone receptacle thereon, an intermittently rotatable stone picker assembly mounted on said chassis forwardly of said receptacle for intermittent rotation about an axis transverse of the chassis, said picker assembly including a transversely elongated cage-like frame, a set of at least three transversely elongated stone picker units mounted at circumferentially equally spaced locations on the perimeter of said cage-like frame, the circumferential spacing of said picker units permitting one unit to occupy a ground-engaging position while another unit occupies a stone-carrying position and while still another unit occupies a stone-dumping position adjacent said receptacle when said picker assembly is not rotating, fluid operator actuated means for intermittently rotating said picker assembly whereby to advance each picker unit from one of its positions to the next, each picker unit comprising a transverse support member pivotally connected to said cage-like frame with its pivot axis parallel to the axis of rotation of the picker assembly and a plurality of transversely spaced parallel picker fingers rigid with and projecting from said support member, said picker fingers having elongated end portions which are parallel to the ground when the picker unit occupies a ground-engaging position, cam-shaped guide means provided on said chassis, and follower means provided on said picker units and operatively engaging said cam-shaped guide means whereby to project the picker units outwardly from said cage-like frame and to retract the units to the frame perimeter, said picker units being projected in their ground-engaging and stone-carrying positions but being retracted in their stone-dumping position, and said cam-shaped guide means including a substantially straight ground-paralleling portion which is traversed by the follower means of each picker unit for a substantial portion of its travel from the ground-engaging toward the stone-carrying position.

2. The machine as defined in claim 1 together with a transverse shaft rotatably mounted on said chassis and having said cage-like frame of said picker assembly secured thereto, said means for intermittently rotating said picker assembly comprising a fluid operator actuated lever mounted for oscillating movement on said shaft, and ratchet clutch means operatively connecting said lever to said shaft whereby the shaft is incrementally rotated in one direction only by oscillation of said lever.

References Cited

UNITED STATES PATENTS 2,732,672    1/1956    Fleischman    171—63
2,793,482    5/1957    Jurgens    171—63

ANTONIO F. GUIDA, *Primary Examiner.*